US006160594A

United States Patent [19]

Hanami et al.

[11] Patent Number: 6,160,594

[45] Date of Patent: Dec. 12, 2000

[54] LIQUID CRYSTAL DEVICE HAVING DRIVE DUTY RATIOS OF ALL DISPLAY PORTIONS IN THE POWER-SAVING OPERATION MODE LOWER THAN THOSE IN THE NORMAL OPERATION MODE

[75] Inventors: Takayoshi Hanami; Takashi Kohata, both of Chiba, Japan

[73] Assignee: Seiko Instruments Inc., Japan

[21] Appl. No.: 08/975,369

[22] Filed: Nov. 20, 1997

[30] Foreign Application Priority Data

| | | | |
|---|---|---|---|
| Nov. 21, 1996 | [JP] | Japan | 8-311065 |
| Mar. 28, 1997 | [JP] | Japan | 9-078404 |

[51] Int. Cl.[7] .......................... G02F 1/133; G02F 1/1343; G02F 1/1345

[52] U.S. Cl. ............................ 349/34; 349/143; 349/152; 345/51; 345/58; 345/91; 345/92; 345/89; 345/95; 345/96; 455/464; 713/321

[58] Field of Search ............................ 349/34, 143, 152; 345/51, 58, 91, 92, 95, 96, 89; 455/464; 713/321

[56] References Cited

U.S. PATENT DOCUMENTS

| | | | |
|---|---|---|---|
| 4,485,380 | 11/1984 | Soneda et al. | 340/784 |
| 4,520,391 | 5/1985 | Edgar et al. | 358/133 |
| 4,764,766 | 8/1988 | Aoyama et al. | 340/784 |
| 4,892,389 | 1/1990 | Kuijk | 350/333 |
| 4,945,352 | 7/1990 | Ejiri | 340/805 |
| 5,252,954 | 10/1993 | Nagata et al. | 345/95 |
| 5,258,754 | 11/1993 | Broderick et al. | 345/51 |
| 5,349,366 | 9/1994 | Yamazaki et al. | 345/92 |
| 5,396,443 | 3/1995 | Mese et al. | 713/321 |
| 5,528,256 | 6/1996 | Erhart et al. | 345/96 |
| 5,797,098 | 8/1998 | Schroeder et al. | 455/464 |

FOREIGN PATENT DOCUMENTS

| | | |
|---|---|---|
| 474231A2 | 3/1992 | European Pat. Off. . |
| 651367A1 | 5/1995 | European Pat. Off. . |
| 811866A1 | 12/1997 | European Pat. Off. . |

*Primary Examiner*—William L. Sikes
*Assistant Examiner*—Julie Ngo
*Attorney, Agent, or Firm*—Adams & Wilks

[57] ABSTRACT

A structure of a liquid crystal device cutting down the power consumption is materialized. In a liquid crystal display device comprising at least two display portions of a dot matrix portion and an icon portion in the same panel, drive is carried out such that both of the display portions are displayed in a normal operation mode and, only the icon portion is displayed in a power-saving operation mode such as when the liquid crystal display device is waiting for operation or is standby. In the power-saving operation mode, the duty ratios of all of the display portions in the power-saving operation mode are lower than those in the normal operation mode, and time shared drive waveforms using the power source voltage as it is which does not require bias voltage are applied.

27 Claims, 7 Drawing Sheets

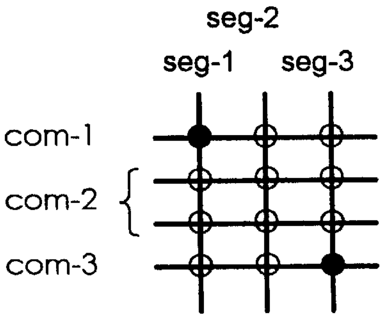
FIG. 6A
FIG. 6B
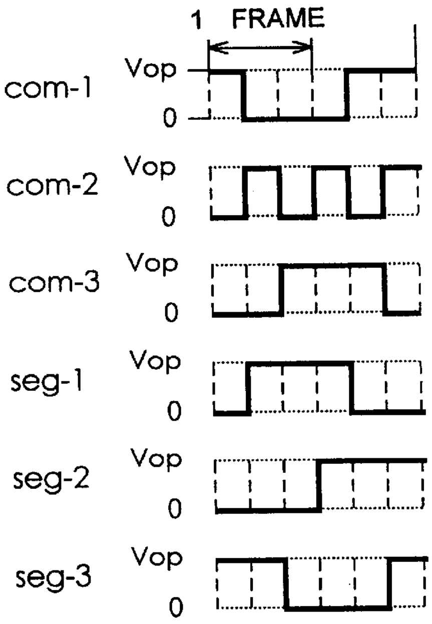
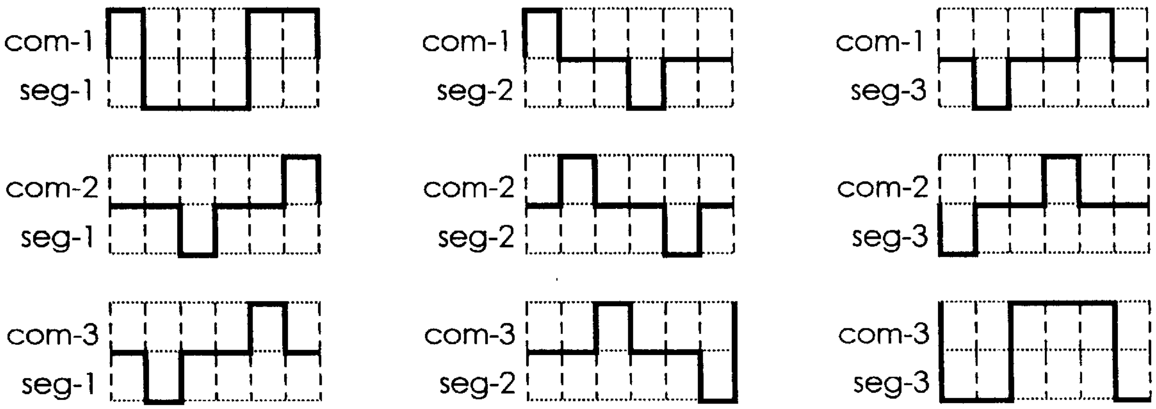
FIG. 6C

F I G. 7 A
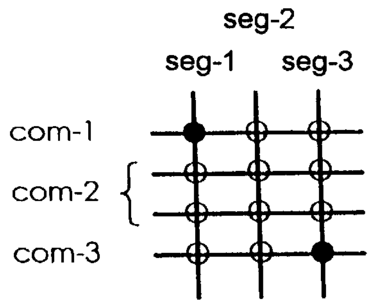
F I G. 7 B
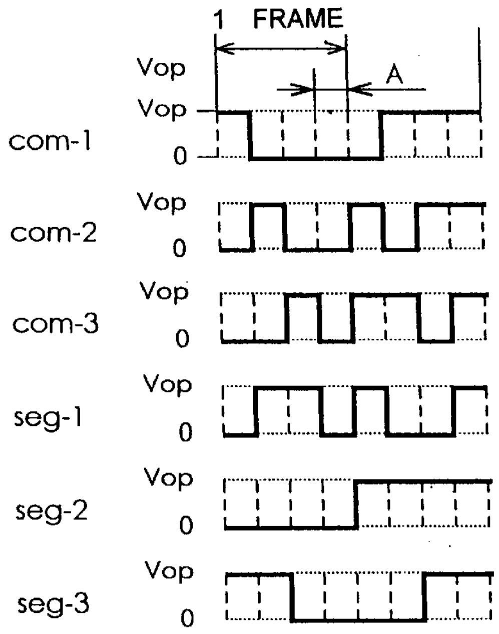
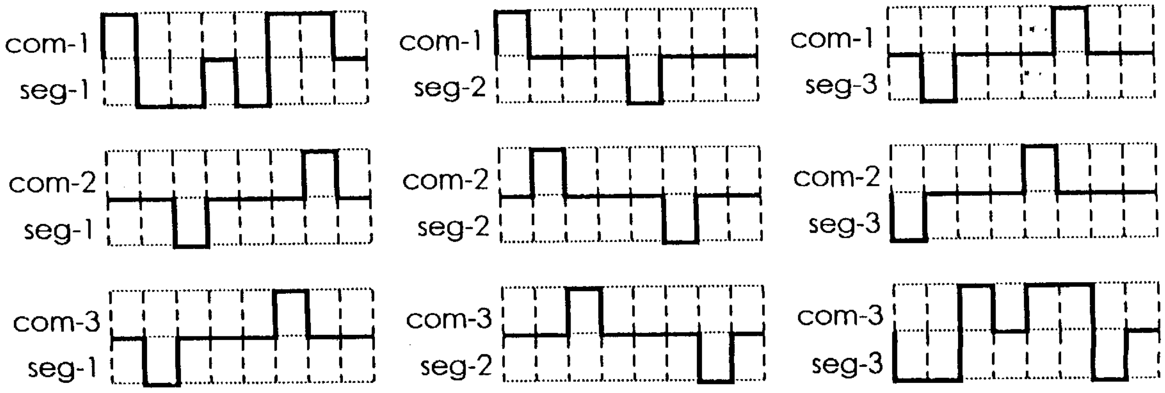
F I G. 7 C

LIQUID CRYSTAL DEVICE HAVING DRIVE DUTY RATIOS OF ALL DISPLAY PORTIONS IN THE POWER-SAVING OPERATION MODE LOWER THAN THOSE IN THE NORMAL OPERATION MODE

BACKGROUND OF THE INVENTION

The present invention relates to a low power consumption-type liquid crystal electro-optic device for use in an apparatus in which a battery is its main power source, such as a portable telephone, a pocket bell, and a pager.

First, the structure of a conventional liquid crystal display device is described as follows. FIG. 2 is a block diagram illustrating the structure of a typical liquid crystal display device. Power source voltage 7 is boosted to be normally doubled or tripled by a booster circuit 9 built in an IC 8. After the voltage is regulated for driving the liquid crystal by a voltage regulator circuit 10, a bias voltage for driving the liquid crystal panel is generated by a bias voltage generator circuit 11. Further, the generated bias voltage is connected, via a voltage stabilizer circuit 12 for stabilizing the voltage, with a scan electrode driver circuit 13 and a signal electrode driver circuit 14 to be ultimately connected with a scan electrode terminal and a signal electrode terminal of the liquid crystal panel 15, respectively.

Here, description is made of wiring and a method of driving scan electrodes and signal electrodes of a liquid crystal panel for use in a conventional liquid crystal display device.

EXAMPLE 1

As shown in FIG. 3, a scan electrode group 16 forming a dot matrix portion and a scan electrode 17 forming an icon portion are made to face a signal electrode group 18. In a liquid crystal panel thus formed, all pixels of the dot matrix portion and the icon portion formed at the intersections of the scan electrode group 16, the scan electrode 17 and the signal electrode group 18 can be placed in an arbitrary state of display in the same duty ratio.

EXAMPLE 2

Alternatively, in order to independently control the display of the icon portion, as shown in FIG. 4, in addition to a scan electrode group and its corresponding signal electrode group 19 forming a dot matrix portion, a scan electrode and its corresponding signal electrode group 20 forming an icon portion are separately provided so as to face each other. In this case, with the dedicated signal electrode group 20 for the icons, the dot matrix portion and the icon portion can be placed in arbitrary states of display in independent duty ratios.

It is to be noted that in FIGS. 3 and 4, in order to take out the scan electrode group and the signal electrode group to electrode terminals 21 on the same substrate, they are connected using upper/lower conductor 22.

Next, a brief description with regard to the time shared drive method is provided.

In the time shared drive method, a selected waveform is applied line-sequentially to each of the scan electrodes. After the selected waveform is applied to every scaning electrodes, scan is repeated again in the same way. Time necessary for one cycle of such scan is referred to as a frame period, and its frequency is referred to as a frame frequency. The ratio of selection time of each of the scan electrode (time necessary for applying a selected waveform to the scan electrode) to the frame period is referred to as a duty ratio.

In time shared drive, an electric field is applied not only to ON (selected) pixels but also to OFF(unselecyed) pixels. Therefore, a threshold characteristic is necessary as an electro-optic characteristic of the LCD, and in this time shared drive, a waveform useful for controlling the state of display is applied only for a predetermined length of time which depends on the duty ratio, and a waveform unrelated to the control of the state of display is applied for the remaining most of the time. Since the liquid crystal also responds to the waveform applied in this non-selection time, it is necessary to manage to make constant the effective voltage of the waveform applied in the non-selection time.

The reason for this is to make uniform the state of display between ON pixels or between OFF pixels with each other, respectively. This driving method is referred to as the voltage averaging method, and this is adopted by all time shared drive LCDs now put to practical use.

FIGS. 5A–5F shows examples of waveforms of the voltage averaging method under a general condition where the duty is 1/N and the bias is 1/a. FIGS. 5A and 5B show waveforms applied to a first scan electrode and a second scan electrode, respectively. FIG. 5C shows a waveform applied to signal electrodes in case of all displaying (selected). FIG. 5D shows a waveform applied to the signal electrodes in case of all undisplaying(unselected). FIG. 5E shows a waveform applied to a lighted pixel. FIG. 5F shows a waveform applied to an unselected pixel.

Even in case of the above-mentioned Example 1, it is possible to place only the icon portion in a displayed state, that is, to place only the icon portion in an arbitrary state of display with the whole dot matrix portion being undisplayed. However, in this case, although apparently only the icon portion is displayed, a drive waveform which is the same as in a normal operation mode is applied to all the scan electrodes and all the signal electrodes, and thus, no power-saving effect can be obtained.

In case of Example 2, in order to place the icon portion in an arbitrary state of display with the whole dot matrix portion being undisplayed, it is sufficient to apply a drive waveform only to a dedicated scan electrode and a dedicated signal electrode group for the icons, and it is not necessary to apply a drive waveform to the dot matrix portion. As a result, a great power-saving effect can be obtained.

However, as is clear from FIG. 4, as number of the icons increases, the number of the dedicated signal electrodes for the icons increases accordingly, and a large area is necessary for the wiring.

SUMMARY OF THE INVENTION

The present invention was made to solve the problems mentioned above. More specifically, an object of the present invention is to provide a liquid crystal display device having a small area of a substrate forming the liquid crystal device which can cut down power consumption.

In order to solve the above problems, according to the present invention, in a power-saving operation mode, only icons are displayed, and the present invention is characterized in that, in the power-saving operation mode, the drive duty ratio of the whole display portion is smaller than that in the normal operation mode such that operation of a circuit necessary for the drive is suppressed.

In a liquid crystal display device structured as mentioned above, as is clear from FIG. 1, the area necessary for the wiring of the signal electrode group is not enlarged. In addition, since the duty ratio is smaller in the power-saving operation mode, compared with a conventional liquid crystal display device that was driven by the same frame frequency, the operation clock of a circuit for producing a drive waveform can be delayed or the operation of the circuit can be stopped, and thus, the power consumption can be cut down.

BRIEF DESCRIPTION OF THE DRAWINGS

FIG. 6A is a explanatory drawing for explaining a driving method of a liquid crystal display device according to the present invention and is an explanatory view schematically illustrating scan electrodes and signal electrodes forming pixels;

FIG. 6B is a waveform illustration for explaining the driving method of the liquid crystal display device according to the present invention and shows an example of waveforms applied to the respective scan electrodes and the respective signal electrodes;

FIG. 6C is a waveform illustration for explaining the driving method of the liquid crystal display device according to the present invention and shows an example of waveforms applied to the pixels formed by the respective scan electrodes and the respective signal electrodes;

FIG. 7A is a explanatory drawing for explaining another driving method of the liquid crystal display device according to the present invention and is an explanatory view schematically illustrating the scan electrodes and signal electrodes forming the pixels;

FIG. 7B is a waveform illustration for explaining the driving method of the liquid crystal display device according to the present invention and shows an example of waveforms applied to the respective scan electrodes and the respective signal electrodes; and FIG. 7C is waveform illustrations for explaining the driving method of the liquid crystal display device according to the present invention and shows an example of waveforms applied to the pixels formed by the respective scan electrodes and the respective signal electrodes.

DETAILED DESCRIPTION OF THE PREFERRED EMBODIMENTS

Figure 1A:
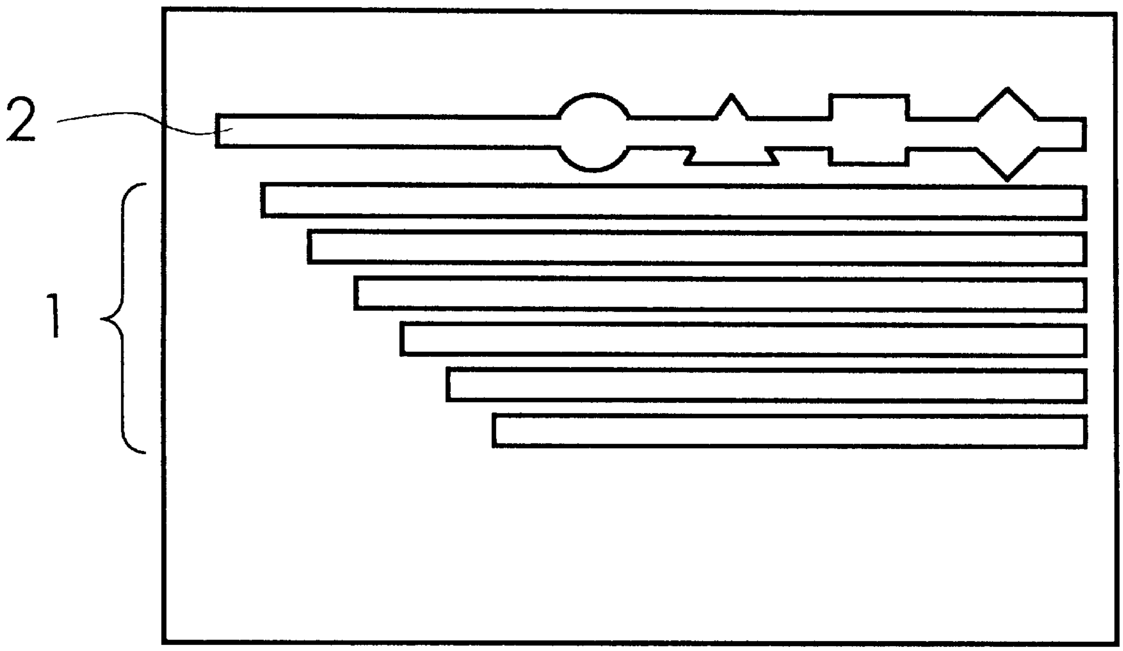
FIG. 1A is a schematic view illustrating wiring of a scan electrode group of a liquid crystal panel according to the present invention.
Figure 1B:
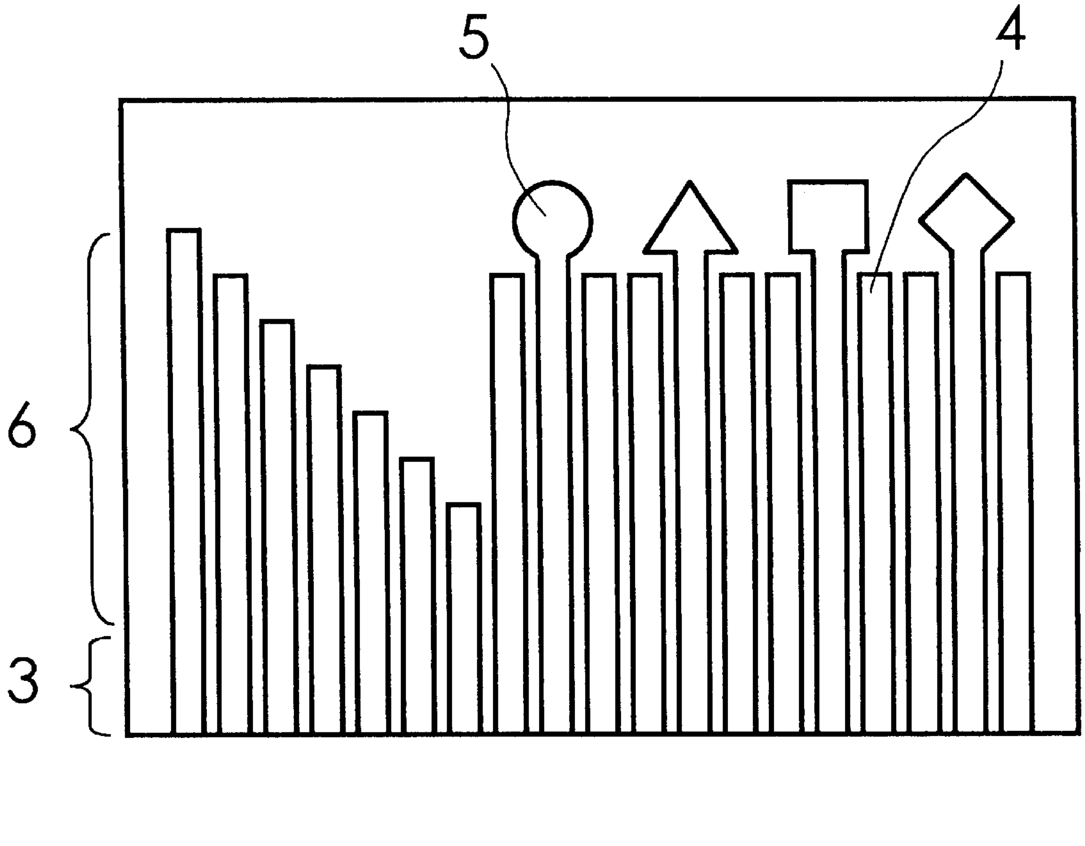
FIG. 1B is a schematic view illustrating wiring of a signal electrode group of the liquid crystal panel according to the present invention.
Figure 2:
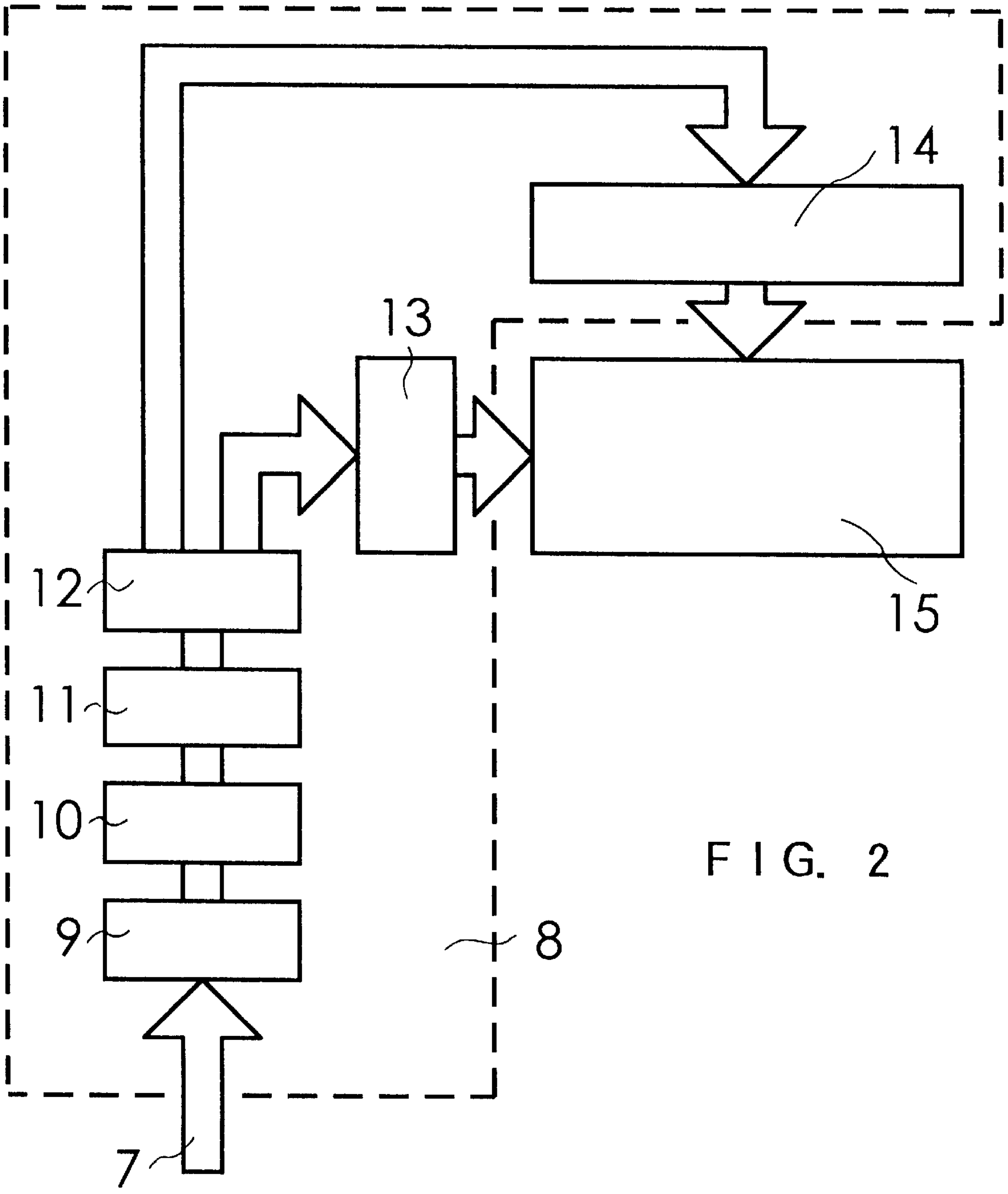
FIG. 2 is a block diagram illustrating the structure of a general liquid crystal display device.
Figure 3:
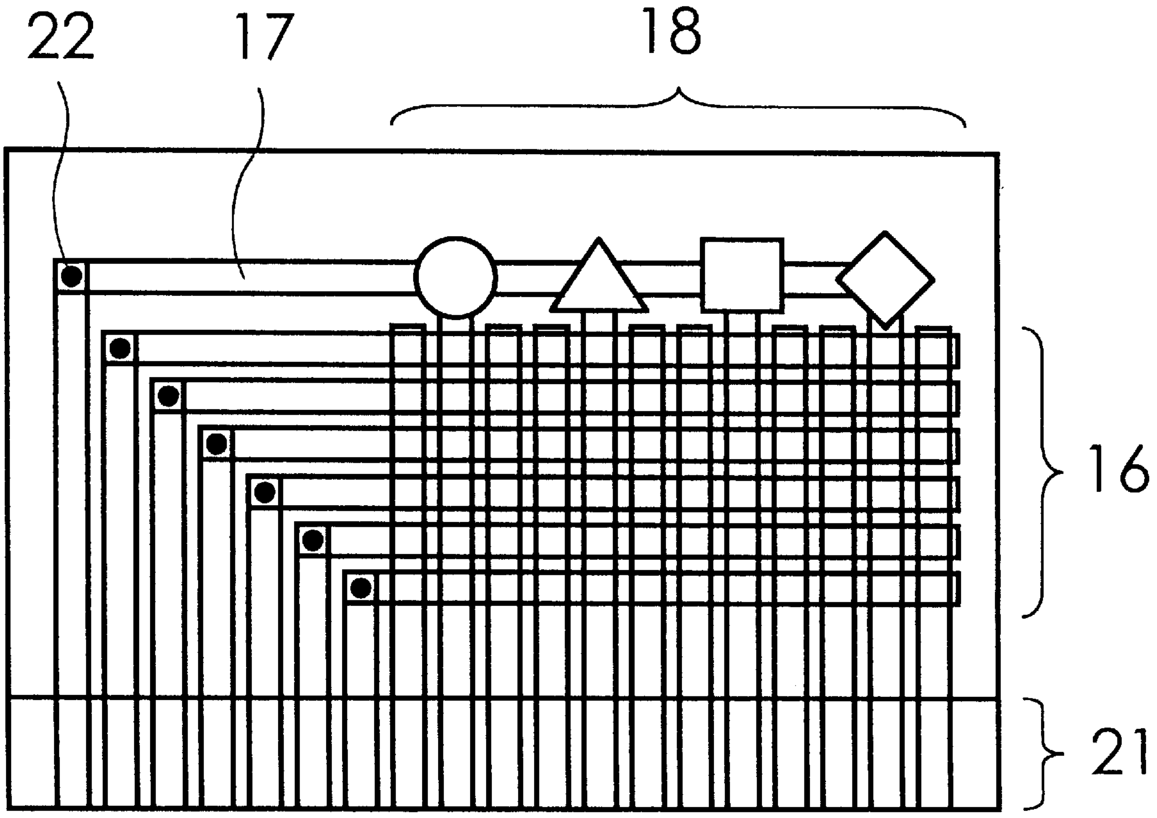
FIG. 3 PRIOR ART
FIG. 3 is a schematic view illustrating wiring of a scan electrode group and of a signal electrode group of a conventional liquid crystal panel.
Figure 4:
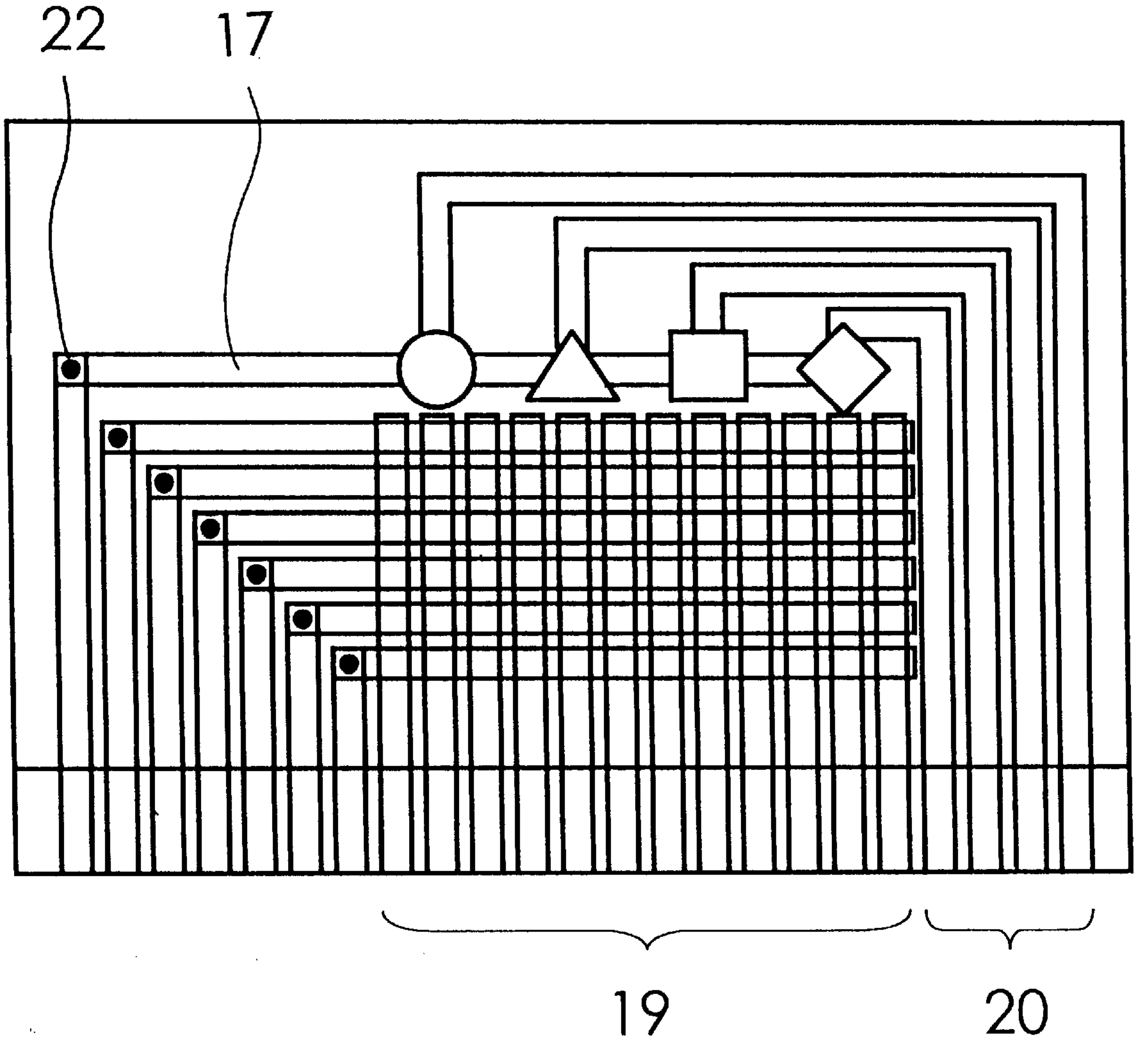
FIG. 4 PRIOR ART
FIG. 4 is a schematic view illustrating wiring of a scan electrode group and of a signal electrode group of another conventional liquid crystal panel.
Figure 5A:
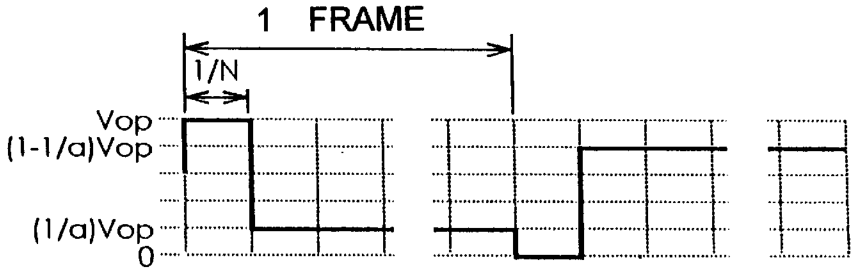
FIG. 5A PRIOR ART
FIG. 5A is a waveform illustration for explaining a driving method of a conventional liquid crystal display device and shows an example of a waveform applied to a first scan electrode.
Figure 5B:
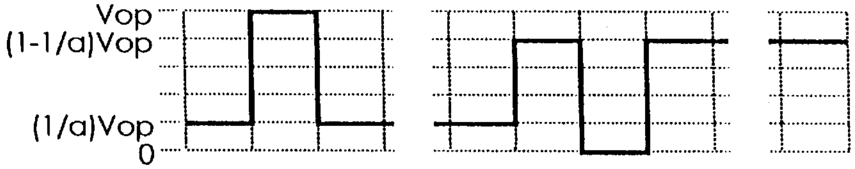
FIG. 5B PRIOR ART
FIG. 5B is a waveform illustration for explaining the driving method of the conventional liquid crystal display device and shows an example of a waveform applied to a second scan electrode.
Figure 5C:
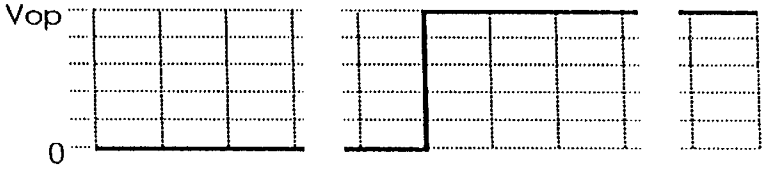
FIG. 5C PRIOR ART
FIG. 5C is a waveform illustration for explaining the driving method of the conventional liquid crystal display device and shows an example of a waveform applied to signal electrodes in case of full selected.
Figure 5D:
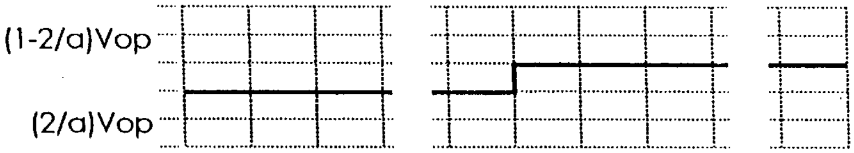
FIG. 5D PRIOR ART
FIG. 5D is a waveform illustration for explaining the driving method of the conventional liquid crystal display device and shows an example of a waveform applied to the signal electrodes in case of full unselected.
Figure 5E:
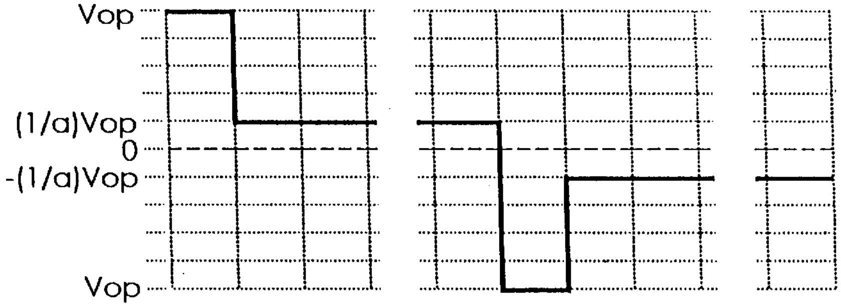
FIG. 5E PRIOR ART
FIG. 5E is a waveform illustration for explaining the driving method of the conventional liquid crystal display device and shows an example of a waveform applied to a selected(displaying) pixel.
Figure 5F:
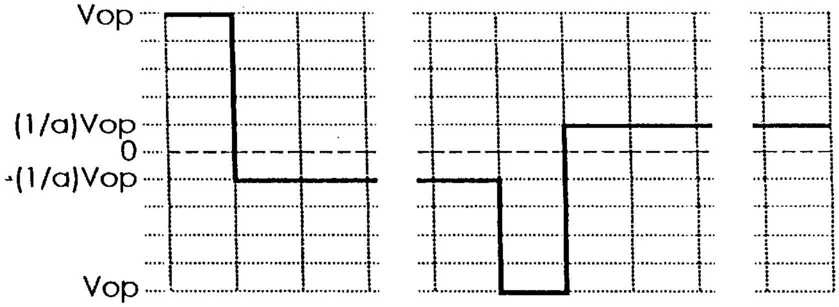
FIG. 5F PRIOR ART
FIG. 5F is a waveform illustration for explaining the driving method of the conventional liquid crystal display device and shows an example of a waveform applied to an unselected (undisplaying)pixel.

Preferred embodiments of the present invention are now described in the following based on the drawings. FIGS. 1A and 1B are schematic views illustrating the wiring of a scan electrode group and a signal electrode group of a liquid crystal panel according to the present invention. A scan electrode group 1 forming a dot matrix portion on a substrate is formed in the shape of stripes, and a scan electrode 2 forming an icon portion is formed on the opposite side of an electrode terminal group 3 on an opposing substrate. Similarly, a signal electrode group 4 forming only a dot matrix portion on the other substrate is in the shape of stripes, and signal electrodes 5 forming both the dot portion and the icon portion are formed at tips of the lines so as to have a shape matching the icons. Wiring 6 is formed on the substrate having the signal electrodes so that electrode terminals for the scan electrodes are formed thereon.

Specific embodiments of a liquid crystal display device according to the present invention and the performance thereof are now described in the following.

EMBODIMENT 1

In a liquid crystal display device with the liquid crystal panel structured as shown in FIGS. 1A and 1B, power source voltage of 3V was boosted to be doubled to 6V by a booster circuit integrated with an IC. After voltage for driving the liquid crystal was generated by a voltage regulator circuit based on the boosted voltage, a waveform for driving the liquid crystal was generated via a bias voltage generator circuit and a voltage stabilizer circuit. In a normal operation mode, the duty was 1/33, the bias was 1/6, and the voltage regulator circuit produced voltage for driving the liquid crystal of 5.8V. In a power-saving operation mode, the voltage regulator circuit produced voltage for driving the liquid crystal of 3.0V, the signal electrodes for the icons regarded as a first scan electrode, the whole signal electrodes for the dot matrix regarded as second scan electrodes, and they were driven with the duty being 1/2 and with the bias being 1/2. Waveforms for driving were in accordance with the normal voltage averaging method.

As a result, while the electric current in the normal operation mode was 100 $\mu$A, the electric current in the power-saving operation mode where only the icons were displayed permitting delay in the operation clock of the circuit was 60 $\mu$A.

It is to be noted that, although the duty was 1/33 and the bias was 1/6, and then, the duty was 1/2 and the bias was 1/2 in the present embodiment, it goes without saying that a similar effect was obtained by other combinations. The higher the duty ratio in the normal operation mode the higher the reduction rate of the power consumption in the power-saving operation mode.

EMBODIMENT 2

In the liquid crystal display device with the liquid crystal panel structured as shown in FIG. 1A and 1B, in a normal operation mode, similarly to Embodiment 1, using a power source voltage of 3V and the above-mentioned circuits built in the IC, normal drive was carried out according to the voltage averaging method with the drive voltage being 5.8 V, the duty being 1/33, and the bias being 1/6. In a power-saving operation mode, the power source voltage of 3V was used as it is, and the liquid crystal was driven with the duty being ½ and with the bias being ½.

As a result, while the electric current in the normal operation mode was 100 $\mu$A, the electric current in the power-saving operation mode where only the icons were displayed was, due to the absence of the booster circuit and the voltage regulator circuit, reduced to 50 $\mu$A.

It goes without saying that a similar effect was obtained by other combinations than the drive conditions of Embodiment

EMBODIMENT 3

In the liquid crystal display device with the liquid crystal panel structured as shown in FIGS. 1A and 1B, in a normal operation mode, similarly to Embodiment 1, using power source voltage of 3V and the above-mentioned circuits built in the IC, normal drive was carried out according to the voltage averaging method with the drive voltage being 5.8 V, the duty being 1/17, and the bias being ¼. On the other hand, in a power-saving operation mode, a time shared drive waveform of the drive voltage of 3.0V which does not require intermediate voltage (bias voltage) was applied.

FIGS. 6A–6C shows an embodiment of the drive waveforms according to the present invention. As shown in FIG. 6A, attention is paid to a display pixel portion formed by an upper icon scan electrode com-1, a lower icon scan electrode com-3, dot matrix scan electrodes com-2, a scan electrode group 1 forming the dot matrix portion generally referred to as dot matrix scan electrodes com-2, and signal electrodes seg-1, 2, and 3, and a case where the pixels formed by seg-1 and com-1 and by seg-3 and com-3 are selected and the other pixels are unselected is shown. Waveforms applied to the respective scan electrodes and the respective signal electrodes in this case are shown in FIG. 6B. Further, FIG. 6C shows waveforms applied between the scan electrodes and the signal electrodes, that is, to the respective display pixels.

In a time shared drive waveform of this kind where the power source voltage can be used without a boost and voltage regulation, a booster circuit, a voltage regulator circuit, a bias voltage generator circuit, and a voltage stabilizer circuit do not have to be used. As a result, while the electric current in the normal operation mode was 90 $\mu$A, the electric current in the power-saving operation mode where such waveforms were applied and only the icons were displayed was 10 $\mu$A.

It is to be noted that it goes without saying that, though FIG. 6 shows an example where alternation occurs in a two-frame cycle, the present invention is not limited thereto.

EMBODIMENT 4

In the liquid crystal display device with the liquid crystal panel structured as shown in FIGS. 1A–1B, in a normal operation mode, similarly to Embodiment 3, normal drive was carried out according to the voltage averaging method with the duty being 1/17, the bias being ¼, and the drive voltage being 4.2V. FIGS. 7A–7C shows drive waveforms in a power-saving operation mode and an embodiment of a driving method according to the present invention. Similar to FIG. 6A, FIG. 7A shows a display pixel portion formed by icon scan electrodes com-1 and com-3, dot matrix scan electrodes com-2, and signal electrodes seg-1, 2, and 3, where pixels shown as ● are selected while pixels shown as are unselected. Waveforms applied to the respective scan electrodes and the respective signal electrodes in this case are shown in FIG. 7B. Further, FIG. 7C shows waveforms applied between the scan electrodes and the signal electrondes, that is, to the respective display pixels. By varying the length of time of the electric potential A shown in the figure during which the effective voltage can be regulated, the effective voltage applied to the liquid crystal panel can be regulated.

The following Table 1 shows effective voltage when the waveforms are applied to the selected pixels and to the unselected pixels, respectively, where the selection time of the scan electrodes is 1 and the value of the electric potential A is varied from 1 to 10. It is to be noted that the drive voltage is, similar to the above, 3.0 V.

TABLE 1

| Value of A | Voltage of Selected Pixel [Vrms] | Voltage of Unselected Pixel [Vrms} |
|---|---|---|
| 0 | 3.000 | 1.732 |
| 1 | 2.598 | 1.500 |
| 2 | 2.324 | 1.342 |
| 3 | 2.121 | 1.225 |
| 4 | 1.964 | 1.134 |
| 5 | 1.837 | 1.061 |
| 6 | 1.732 | 1.000 |
| 7 | 1.643 | 0.949 |
| 8 | 1.567 | 0.905 |
| 9 | 1.500 | 0.866 |
| 10 | 1.441 | 0.832 |

This permits accommodation to liquid crystal to which low voltage is applied.

Similar to Embodiment 3, since the power source voltage can be used without a boost and voltage regulation, a booster circuit, a voltage regulator circuit, a bias voltage generator circuit, and a voltage stabilizer circuit do not have to be used. As a result, while the electric current in the normal operation mode was 90 $\mu$A, the electric current in the power-saving operation mode where such waveforms were applied and only the icons were displayed was 10 $\mu$A.

It is to be noted that it goes without saying that, though, in FIGS. 7A–7C, the electric potential A where the effective voltage is regulated is placed at one place in one frame, the present invention is not limited thereto.

As described in the above, according to the present invention, a liquid crystal display device is obtained which can greatly cut down power consumption in a power-saving operation mode where only icons are displayed, without enlarging the area necessary for wiring of a signal electrode group.

What is claimed is:

1. In a liquid crystal display device comprising a pair of opposed substrates, electrodes formed on the substrates including a plurality of scanning electrodes arranged in rows and a plurality of signal electrodes arranged in columns, a liquid crystal material disposed between the substrates so that a pixel is formed at each intersection of a scanning electrode and a signal electrode, wherein at least one of the electrodes has a portion formed in the shape of a symbol, so that at least two display portions are provided including a dot matrix portion formed of pixels and an icon portion in the region having the electrode portion formed in the shape of a symbol, and a driving circuit for driving the liquid crystal display device on a time shared driving basis whereby the scanning electrodes are sequentially activated, the improvement comprising: wherein the liquid crystal display device may be driven in a normal operation mode in which information may be displayed on both of the display portions and in a power-saving operation mode, in which the liquid crystal display device is waiting for operation or is in a standby state, wherein information may be displayed on only the icon portion, and wherein during operation in the power-saving operation mode a scanning electrode associated with the icon display portion is driven individually and plural signal electrodes associated with the dot matrix display portion are driven as a group.

2. The liquid crystal display device according to claim 1; wherein drive duty ratios of all of the display portions in the power-saving operation mode are lower than those in the normal operation mode.

3. The liquid crystal display device according to claim 1; wherein the driving circuit comprises logic circuitry for generating driving signals for driving the dot matrix display portion and the icon display portion; and wherein the voltage level used for driving the liquid crystal in the power-saving operation mode is the same level used as a power source voltage of the logic circuitry.

4. The liquid crystal display device according to claim 3; wherein the driving circuit generates time shared drive waveforms which do not require intermediate voltage and which are applied to the liquid crystal display panel in the power-saving operation mode.

5. The liquid crystal display device according to claim 4; wherein the driving circuit generates drive waveforms having an electric potential portion permitting regulation of the effective voltage and which are applied to the liquid crystal material.

6. A liquid crystal display device comprising: a liquid crystal display panel having at least two display portions including a first portion formed of pixels and a second portion formed of one or more icons each having an electrode formed in the shape of an icon; and a driving circuit for driving the liquid crystal display panel in a time shared basis in a normal operation mode in which information may be displayed on all of the display portions and in a power-saving operation mode in which information may be displayed on only the second portion; wherein duty ratios of signals applied to the first portion during the power-saving operation mode are lower than those applied to the first portion during the normal mode of operation to thereby reduce power consumption of the liquid crystal display device.

7. A liquid crystal display device according to claim 6; wherein the liquid crystal display panel comprises a pair of opposed substrates, electrodes formed on the opposed substrates including a plurality of scanning electrodes arranged in rows and a plurality of signal electrodes arranged in columns, and a liquid crystal material disposed between the substrates so that a pixel is formed at each intersection of a scanning electrode and a signal electrode, wherein at least one of the electrodes has a portion formed in the shape of a symbol, so that the display panel is provided with at least two display portions including a dot matrix portion formed of pixels and an icon portion in the region having the electrode portion formed in the shape of a symbol.

8. A liquid crystal display device according to claim 7; wherein during operation in the power-saving operation mode a scanning electrode associated with the icon portion is driven individually and plural signal electrodes associated with the dot matrix display portion are driven as a group.

9. A liquid crystal display device according to claim 7; wherein during operation in the power-saving operation mode the second display portion is driven individually and plural electrodes associated with the first display portion are driven as a group.

10. A liquid crystal display device according to claim 6; wherein the driving circuit comprises a logic circuit for generating driving signals for driving the first portion and the second portion; and wherein the voltage level used for driving the liquid crystal in the power-saving operation mode is the same level used as a power source voltage of the logic circuitry.

11. A liquid crystal display device according to claim 6; wherein the driving circuit generates time shared drive waveforms which do not require intermediate voltage and which are applied to the liquid crystal display panel in the power-saving operation mode.

12. A liquid crystal display device according to claim 6; wherein the driving circuit generates drive waveforms having an electric potential portion permitting regulation of the effective voltage and which are applied to the liquid crystal display panel in the power-saving operation mode.

13. A liquid crystal display device comprising: a liquid crystal display panel having at least two display portions including a first portion formed of pixels and a second portion formed of one or more icons each having an electrode formed in the shape of an icon; and a driving circuit for driving the liquid crystal display panel in a time shared basis in a normal operation mode in which information may be displayed on all of the display portions and in a power-saving operation mode in which information may be displayed on only the second portion; wherein a plurality of scanning electrodes associated with the first portion are driven simultaneously as a group during the power-saving operation mode and not during the normal operation mode.

14. A liquid crystal display device according to claim 13; wherein duty ratios of signals applied to the first portion during the power-saving operation mode are lower than those applied to the first portion during the normal mode of operation to thereby reduce power consumption of the liquid crystal display device.

15. A liquid crystal display device according to claim 13; wherein the liquid crystal display panel comprises a pair of opposed substrates, electrodes formed on the opposed substrates including a plurality of scanning electrodes arranged in rows and a plurality of signal electrodes arranged in columns, and a liquid crystal material disposed between the substrates so that a pixel is formed at each intersection of a scanning electrode and a signal electrode, wherein at least one of the electrodes has a portion formed in the shape of a symbol, so that the display panel is provided with at least two display portions including a dot matrix portion formed of pixels and an icon portion in the region having the electrode portion formed in the shape of a symbol.

16. A liquid crystal display device according to claim 15; wherein during operation in the power-saving operation mode a scanning electrode associated with the icon portion is driven individually and plural signal electrodes associated with the dot matrix display portion are driven as a group.

17. A liquid crystal display device according to claim 13; wherein the driving circuit comprises a logic circuit for generating driving signals for driving the first portion and the second portion; and wherein the voltage level used for driving the liquid crystal in the power-saving operation mode is the same level used as a power source voltage of the logic circuitry.

18. A liquid crystal display device according to claim 13; wherein the driving circuit generates time shared drive waveforms which do not require intermediate voltage and which are applied to the liquid crystal display panel in the power-saving operation mode.

19. A liquid crystal display device according to claim 13; wherein the driving circuit generates drive waveforms having an electric potential portion permitting regulation of the effective voltage and which are applied to the liquid crystal display panel in the power-saving operation mode.

20. A liquid crystal display device comprising: a pair of opposed substrates; a plurality of electrodes formed on the substrates including a plurality of scanning electrodes arranged in rows and a plurality of signal electrodes arranged in columns whereby a pixel element is formed at each intersection of a scanning electrode and a signal electrode, at least one of the electrodes having a portion formed in the shape of a symbol, so that the liquid crystal display device has at least two display portions including a dot matrix portion formed of pixels and an icon portion in the region having the electrode portion formed in the shape of a symbol; a liquid crystal material disposed between the substrates; and a driving circuit for driving the liquid crystal display device on a time shared driving basis whereby the scanning electrodes are sequentially activated; wherein the liquid crystal display device may be driven in a normal operation mode in which information may be displayed on both of the display portions and in a power-saving operation mode in which information may be displayed on only the icon portion.

21. A liquid crystal display device according to claim 20; wherein the driving circuit generates signals for driving the liquid crystal display device during operation in the power-saving operation mode such that a scanning electrode associated with the icon display portion is driven individually and plural signal electrodes associated with the dot matrix display portion are driven as a group.

22. A liquid crystal display device according to claim 21; wherein drive duty ratios of all of the display portions in the power-saving operation mode are lower than those in the normal operation mode.

23. A liquid crystal display device according to claim 20; wherein drive duty ratios of all of the display portions in the power-saving operation mode are lower than those in the normal operation mode.

24. A liquid crystal display device according to claim 20; wherein the driving circuit comprises logic circuitry for generating driving signals for driving the dot matrix display portion and the icon display portion; and wherein the voltage level used for driving the liquid crystal display device in the power-saving operation mode is the same level used as a power source voltage of the logic circuitry.

25. A liquid crystal display device according to claim 20; wherein the driving circuit generates time shared drive waveforms which do not require intermediate voltage and which are applied to the liquid crystal material in the power-saving operation mode.

26. A liquid crystal display device according to claim 25; wherein the driving circuit generates drive waveforms having an electric potential portion permitting regulation of the effective voltage and which are applied to the liquid crystal material.

27. A power saving driving method for driving a liquid crystal display device on a time shared basis, the liquid crystal display device having a liquid crystal display panel having a plurality of scanning electrodes arranged in rows and a plurality of signal electrodes arranged in columns, a pixel element being formed at each intersection of a scanning electrode and a signal electrode, and at least one of the electrodes having a portion formed in the shape of a symbol, so that the display panel is provided with at least two display portions including a dot matrix portion formed of pixels and an icon portion having the at least one electrode formed in the shape of a symbol, comprising the steps of:

operating the display device in a normal mode by generating scanning signals for sequentially selecting scanning electrodes in the icon portion and the dot matrix portion, respectively, while driving signals are applied to the signal electrodes so that information can be displayed on the dot matrix portion and the icon portion; and operating the display device in a low power mode in which a scanning signal is generated for selecting the icon portion and a plurality of the scanning electrodes of the dot matrix portion are selected simultaneously as a group.

* * * * *